(12) United States Patent
Seifert

(10) Patent No.: US 8,724,123 B2
(45) Date of Patent: May 13, 2014

(54) METHOD AND DEVICE FOR VEHICLE MEASUREMENT

(71) Applicant: Wolfgang Seifert, Wielenbach (DE)

(72) Inventor: Wolfgang Seifert, Wielenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/011,355

(22) Filed: Aug. 27, 2013

(65) Prior Publication Data

US 2014/0063510 A1 Mar. 6, 2014

(51) Int. Cl.
*G01B 11/02* (2006.01)
*G01B 21/20* (2006.01)
*G01B 5/008* (2006.01)
*G01B 11/10* (2006.01)
*G01B 13/18* (2006.01)
*G01B 3/12* (2006.01)

(52) U.S. Cl.
CPC ............ *G01B 21/20* (2013.01); *G01B 5/008* (2013.01); *G01B 11/10* (2013.01); *G01B 13/18* (2013.01); *G01B 3/12* (2013.01)
USPC ......................................... 356/635; 701/29.1

(58) Field of Classification Search
None
See application file for complete search history.

(56) References Cited

U.S. PATENT DOCUMENTS

| 5,532,816 | A | * | 7/1996 | Spann et al. ............. 356/139.09 |
| 5,978,077 | A | * | 11/1999 | Koerner et al. .......... 356/139.09 |
| 6,237,234 | B1 | | 5/2001 | Jackson et al. |
| 7,454,841 | B2 | * | 11/2008 | Burns, Jr. et al. ........ 356/139.09 |
| 7,869,018 | B2 | | 1/2011 | Strege et al. |
| 2002/0001076 | A1 | * | 1/2002 | Jackson et al. ........... 356/139.09 |
| 2005/0030525 | A1 | * | 2/2005 | Forster et al. ............ 356/139.09 |
| 2006/0274302 | A1 | * | 12/2006 | Shylanski et al. ....... 356/139.09 |
| 2008/0119978 | A1 | * | 5/2008 | Stieff et al. ..................... 701/29 |
| 2009/0080703 | A1 | * | 3/2009 | Hammerschmidt et al. .. 382/104 |
| 2010/0177304 | A1 | * | 7/2010 | Rogers ..................... 356/139.09 |
| 2010/0303336 | A1 | * | 12/2010 | Abraham et al. ............ 382/154 |
| 2013/0188020 | A1 | * | 7/2013 | Seifert et al. .................... 348/46 |

* cited by examiner

*Primary Examiner* — Gregory J Toatley
*Assistant Examiner* — Juan D Valentin, II
(74) *Attorney, Agent, or Firm* — Kenyon & Kenyon LLP

(57) ABSTRACT

A method for determining the rolling radius of a wheel, of a motor vehicle on a road surface, including: projecting a light pattern onto the wheel and road surface; recording a light pattern reflected by the wheel and road surface using an image recording device; determining 3D coordinates of points of the reflected light pattern; identifying points of the reflected light pattern of the wheel; identifying points of the reflected light pattern of the road surface; determining the position of the center of rotation of the wheel from the reflected light pattern points identified as belonging to the wheel; determining the position of the road surface from the reflected light pattern points identified as belonging to the road surface; determining the rolling radius on the contact surface of the wheel as the distance between the center of rotation of the wheel and the position of the road surface.

10 Claims, 3 Drawing Sheets

METHOD AND DEVICE FOR VEHICLE MEASUREMENT

RELATED APPLICATION INFORMATION

The present application claims priority to and the benefit of German patent application no. 10 2012 215 754.9, which was filed in Germany on Sep. 5, 2012, the disclosure of which is incorporated herein by reference.

FIELD OF THE INVENTION

The present invention relates to a method and a device for optical vehicle measurement and in particular for determining the rolling radius of a wheel of a vehicle.

BACKGROUND INFORMATION

Planarity and the horizontal alignment of the measurement site play a major role in wheel alignment. Furthermore, there is interest in determining the rolling radius, i.e., the distance between the wheel contact surface and the rotation center of the wheel, for the handling of errors and defects, for example, chassis defects or uneven air pressure in the tires.

Optical measurement systems based on marks, such as those in U.S. Pat. No. 6,237,234 B1, for example, are believed to be understood for this in the related art. With these systems, the center of the wheel is determined with the aid of marks ("targets") mounted on the wheel.

The position of the road surface may also be determined online or offline by mounting additional marks at a known distance from the surface of the measurement site (road surface) (see, for example, U.S. Pat. No. 7,869,018 B2).

For determining the rolling radius using such methods, marks on the wheel are also necessary in addition to marks provided on the surface of the measurement site or the vehicle platform. It is time-consuming to mount the marks and under some circumstances this may even cause damage to the wheel rims.

SUMMARY OF THE INVENTION

An object of the present invention is therefore to make available a method and a device which will enable a determination of the rolling radius of a vehicle wheel without mounting marks on the wheel and/or to the road surface.

A method according to the present invention for determining the rolling radius of a wheel, in particular a wheel of a motor vehicle standing on a road surface, includes the following steps:
a) projecting a light pattern onto the wheel and the road surface;
b) recording a light pattern reflected by the wheel and the road surface using an image recording device;
c) determining 3D coordinates of points of the reflected light pattern;
d) identifying points of the reflected light pattern belonging to the wheel;
e) identifying points of the reflected light pattern belonging to the road surface;
f) determining the position of the rotation center of the wheel from the points of the reflected light pattern, which have been identified as belonging to the wheel;
g) determining the position of the road surface from the points of the reflected light pattern, which have been identified as belonging to the road surface;
h) determining the rolling radius on the wheel contact surface as the distance between the road surface and the rotation center of the wheel.

The distance between the rotation center of the wheel and the road surface may be measured at a right angle to the road surface.

The distance may also be measured approximately at a slightly different angle, for example, at a right angle to the axis of rotation of the wheel.

Another specific embodiment of a method according to the present invention for determining the rolling radius of a wheel includes the following steps:
a) projecting light onto the wheel;
b) recording points of light reflected by the wheel using an image recording device;
c) determining the rotation center of the wheel and a characteristic point on the wheel, which is outside of the rotation center of the wheel, from the points of light reflected by the wheel;
d) determining the spatial orientation of a connecting line between the characteristic point and the rotation center;
e) rolling the wheel on a road surface;
f) recording points of light reflected by the rolled wheel;
g) determining the position of the rotation center and the position of the characteristic point of the rolled wheel from the points of light reflected by the rolled wheel;
h) determining the spatial orientation of the connecting line between the characteristic point and the rotation center of the rolled wheel;
i) determining the angle by which the wheel is rolled from the change in the spatial orientation of the connecting line before and after rolling the wheel;
j) determining the distance over which the wheel has rolled from the change in the position of the rotation center before and after rolling the wheel parallel to the road surface;
k) determining the rolling radius of the wheel from the rolling angle and the distance over which the wheel has rolled.

The characteristic point may be the valve, for example, or a feature on the sidewall of a tire mounted on the wheel.

The present invention also includes a device for determining the rolling radius of a wheel, in particular a wheel of a motor vehicle situated on a road surface, having
   at least one lighting device, which is configured to project light onto the wheel and onto the road surface;
   at least one image recording device, which is configured to record points of light reflected by the wheel and the road surface; and
   an evaluation device, which is configured to determine the rolling radius of the wheel using a method according to the present invention.

The methods and devices according to the present invention do not require that targets be mounted on the wheel or the road surface. The rolling surface is easily measurable directly with each wheel alignment. The measurement may also be carried out on a moving vehicle, while the vehicle is rolling past the measuring device at a low speed.

With the traditional determination of the position of the road surface with the aid of marks mounted on the road surface, an indirect and error-prone measurement of the road surface is carried out. The test of multiple sections of the road surface by incrementally moving two interconnected marks is time-consuming, and is therefore carried out only occasionally, which further increases the susceptibility of the measurements to errors. Such errors are avoidable through the methods according to the present invention and a device according to the present invention.

Obstacles and partial unevenness in the road surface are detectable, as is inadequate horizontal alignment of the road surface.

There is the possibility of optimizing the wheel alignment by taking into account the road surface, the rolling radius and/or the level of the vehicle. It is possible in particular to detect invalid measured values caused by unevenness in the road surface. Image sequences having an undesirable deflection of the wheel suspension during passing may also be removed from the calculation.

Unequal rolling radii of the wheels of an axle may be a sign of unequal tire pressure values or unequal wear on the tires.

The shock absorbers may also be checked by placing known obstacles on the road surface at a suitable measurement speed.

As a result, information may be provided to the user, including suggestions for error correction.

One specific embodiment of a method according to the present invention includes determining the track width of the vehicle. This permits an accurate determination of the rolling radius even in cases in which the axis of rotation of the wheel is not parallel to the road surface.

One, specific embodiment of a method according to the present invention includes subdividing the road surface into multiple segments and determining the height of each individual segment. This permits an accurate determination of the rolling radius even in cases in which the road surface is configured with gradations.

One specific embodiment of a method according to the present invention includes recording the reflected points of light using multiple measured value sensors and transferring their coordinates to a coordinate system shared by all measured value sensors. This makes it possible to determine the rolling radii of all wheels and the wheel height of the vehicle in a shared (global) coordinate system.

One specific embodiment of a method according to the present invention includes comparing the rolling radii of at least two wheels of the vehicle and outputting a message when a difference between the rolling radii exceeds a predefined threshold.

In particular it is generally not necessary to determine the exact absolute value of the rolling radius of each wheel. It must rather be ensured that the rolling radius is measured and calculated on all wheels of the vehicle in the same way, to be able to compare the rolling radii of the individual wheels with one another and to determine differences between the rolling radii of the individual wheels.

One specific embodiment of a method according to the present invention includes using reference systems in a method using multiple measured value sensors to define a global coordinate system. Reference systems make it possible to define a global coordinate system with high accuracy.

One specific embodiment of a method according to the present invention includes recording the points of light using at least two cameras set up at a distance from one another or using a stereo camera and determining the 3D coordinates of each point of light by triangulation. In this case, structured illumination of the wheel and of the road surface is not necessary to determine the 3D coordinates of the points of light.

An alternative specific embodiment of a method according to the present invention includes illuminating the wheel and the road surface using a calibrated structured illumination. It is sufficient in this case to record the reflected points of light using a single mono camera for the purpose of determining the 3D coordinates of each point of light. A stereo camera is not necessary.

The present invention is explained in greater detail below on the basis of the accompanying drawings.

DETAILED DESCRIPTION

Figure 1:
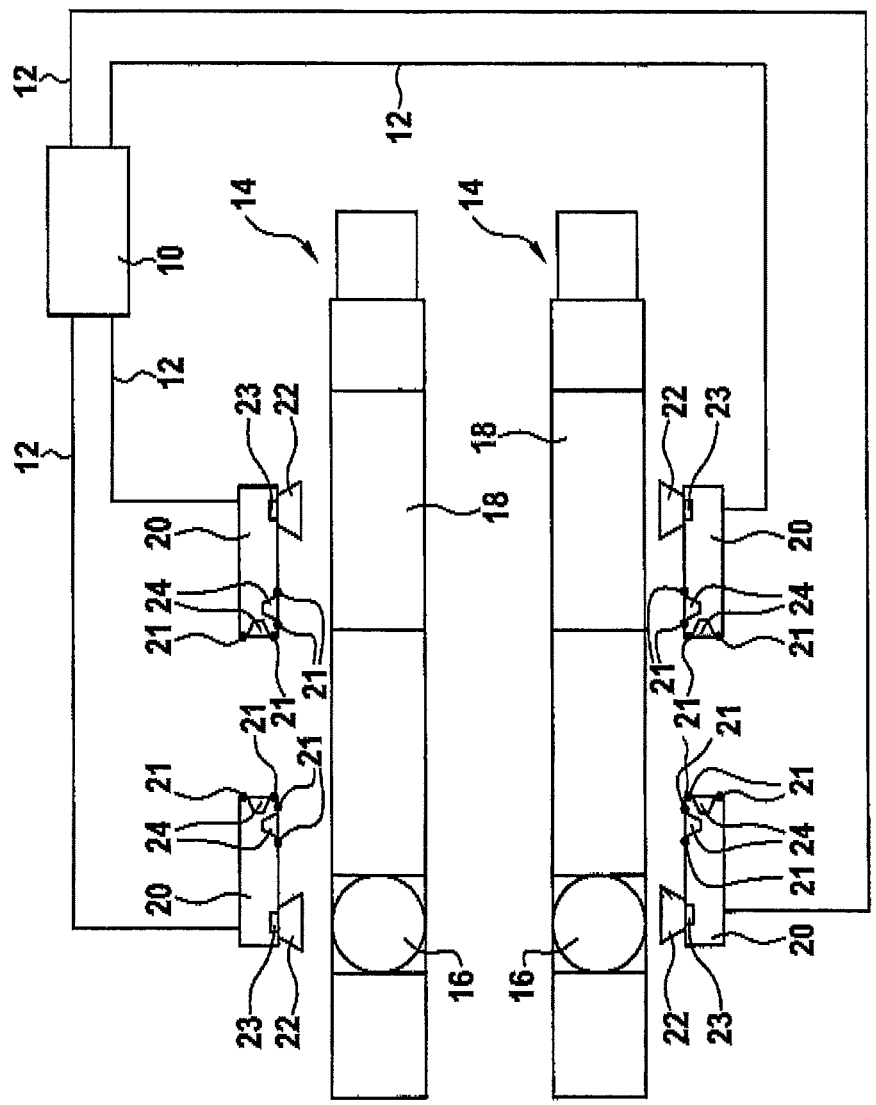
FIG. 1 shows a schematic top view of a measurement site for the vehicle measurement.

FIG. 1 shows a schematic top view of a measurement site for the vehicle measurement.

The measurement site has two parallel rails 14, which may be rails 14 of a car lift, for example. However, rails 14 may also be permanently installed on the bottom of the measurement site. Alternatively, the method may also be carried out without rails 14 on the bottom of the measurement site.

In an area shown on the left of FIG. 1, each of the two rails 14 is equipped with a rotating plate 16, thus allowing the steerable wheels of a vehicle situated on rails 14 to be turned when the vehicle is situated on rails 14 in such a way that its steerable wheels are supported on rotating plates 16.

Rails 14 each have a sliding plate 18 in an area shown on the right side of FIG. 1. Sliding plates 18 are displaceable in parallel with the longitudinal extent of rails 14 and may thus be situated at a variable distance from corresponding rotating plates 16. The measurement site may be adapted in this way to different vehicles having different distances between the front wheels and the rear wheels.

Four measured value sensors 20 are situated in a rectangular pattern around rails 14. Two (front) measured value sensors 20 are situated at the height of rotating plates 16 and thus next to the usually steerable front wheels of a vehicle parked on rails 14. Two (rear) measured value sensors 20 may be moved along rails 14 so that their positions may be adapted to the wheelbase of the vehicle to be measured in such a way that rear measured value sensors 20 are always positioned opposite the rear wheels of the vehicle parked on rails 14.

Each measured value sensor 20 has an image recording device (image sensor) 22 for measured value detection, configured as a (stereo) camera, for example, and also has an integrated illumination device 23 configured to illuminate the wheel to be measured, which is opposite a corresponding measured value sensor 20.

Each measured value sensor 20 also has two reference systems, each having at least two integrated position lights 21 and one optical sensor 24. The reference systems are configured to determine the position of a corresponding measured value sensor 20 with respect to at least two other measured value sensors 20 in order to be able to determine the coordinates of the pixels recorded by individual measured value sensors 20 in a shared (global) coordinate system.

Measured value sensors 20 are connected to a central evaluation device 10 via data lines 12. Alternatively, measured value sensors 20 may be connected wirelessly to central evaluation device 10. Evaluation device 10 may also be situated in one or multiple measured value sensors 20.

Figure 2:
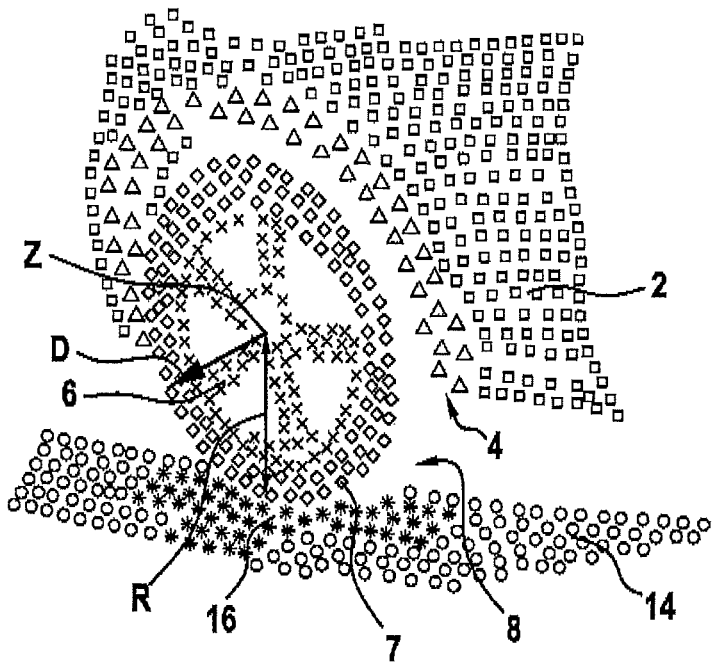
FIG. 2 shows an example of a 3D point cloud recorded by a front left measured value sensor.

FIG. 2 shows an example of a 3D point cloud recorded by a measured value sensor 20 situated at the left front wheel 8 of a vehicle.

The assignment of the recorded points to wheel 8, to chassis 2, to wheel house 4 and to road surface 14, 16 is determined by a combination of intelligent image processing algorithms. Center of rotation Z and axis of rotation D of wheel 8 are determined from the points assigned to wheel 8 or to tire 7 and to rim 6 of wheel 8. DE 10 2006 048 725 A1 describes a method suitable for this purpose.

The position of the road surface is determined from the points assigned to road surface 14, 16 or to the rail. To improve the accuracy in determining the position of the road surface, road surface 14, 16 may be subdivided into multiple segments, the position of each segment then being determined. For this purpose several groups of 3D points are formed from the 3D points assigned to road surface 14, 16 as a function of their Z coordinates, the desired tolerance band widths and the XY coordinates, various planes being fitted into these groups. This is reasonable in particular when road surface 14, 16 has minor gradations, which may occur in particular when rotating plates 16 described above are situated in road surface 14, 16.

Quasistatic rolling radius R is then determined as the distance between axis D of rotation and center of rotation Z of wheel 8 and of road surface 14, 16 about the wheel contact surface, the distance being measured at a right angle to road surface 14, 16.

Figure 3:
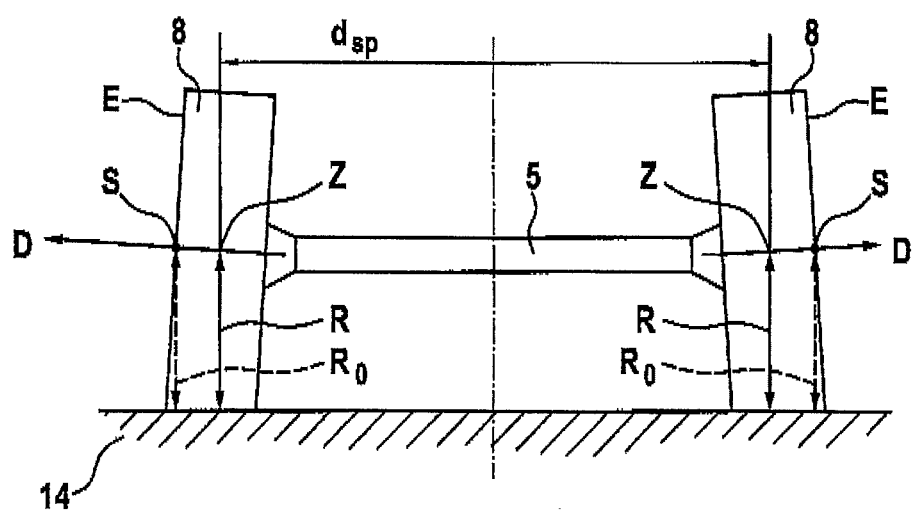
FIG. 3 shows a schematic view to illustrate a first method for determining the rolling radius.

FIG. 3 schematically shows an axle 5 of a vehicle having two wheels 8 at the front or at the rear.

Since axis of rotation D of wheels 8 does not necessarily run parallel to road surface 14, as also shown in the example in FIG. 3, the position of center of rotation Z of wheel 8 (wheel hub) in the direction parallel to axle 5 or approximately track width $d_{SP}$ is important for correct determination of rolling radius R.

Rolling radius R may be calculated if the position of center of rotation Z of wheel 8 and track width $d_{SP}$ are known from the manufacturer's information in the setpoint data of the measurement system-vehicle database. If track width $d_{SP}$ is unknown, a simplified rolling radius $R_0$ may also be determined approximately at a point of intersection S of plane E of tire 7 or of wheel 8 with axis of rotation D of wheel 8 perpendicular to road surface 14. Simplified rolling radius $R_0$ may be corrected, if necessary, by a parameter obtained from the camber and/or width of wheel 8.

Figure 4:
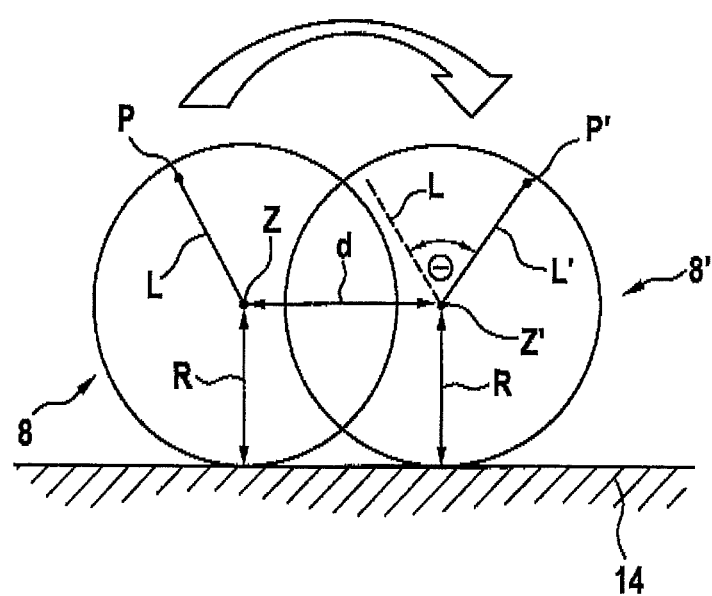
FIG. 4 shows a schematic view to illustrate a second method for determining the rolling radius.

FIG. 4 shows another possibility for a noncontact determination of rolling radius R without using marks on the wheel.

As described already, center of rotation Z of wheel 8 and also a characteristic point P on wheel 8, which is outside of center of rotation Z, for example, the valve of a tire 7 mounted on wheel 8, are determined from the 3D point cloud.

Wheel 8 is then rotated about its axis of rotation D by an angle Θ and is thereby rolled on road surface 14.

The measurement is repeated for wheel 8' rolled on road surface 14 in this way, i.e., a second 3D point cloud is recorded, the points of the second 3D point cloud belonging to wheel 8' are determined, and wheel center Z', now shifted parallel to road surface 14, and the altered position of characteristic point P' due to the rolling movement are determined.

Distance d between centers of rotation Z, Z' before and after the rolling of wheel 8, 8' parallel to road surface 14 is equal to distance d traveled by wheel 8, 8' parallel to road surface 14 due to the rolling movement.

In addition, from the change in the position of characteristic point P, P' or the altered orientation of a connecting line L, L' between characteristic point P, P' and center of rotation Z, Z' of rolling angle Θ of wheel 8, 8' may be determined.

Rolling radius R is determinable directly from these two variables:

$$R = d \times 360° / (2\pi \times \Theta)$$

if rolling angle Θ of wheel 8, 8' is measured in degrees, i.e., $$R = d/\Theta$$

when rolling angle Θ of wheel 8, 8' is measured in radians.

The second method described here therefore also allows a highly precise determination of rolling radius R of a wheel 8, 8' without having to mount marks on wheel 8, 8' or having to touch wheel 8, 8' with a measuring device.

What is claimed is:

1. A method for determining a rolling radius of a wheel, of a motor vehicle on a road surface, the method comprising:
    projecting a light pattern onto the wheel and the road surface;
    recording a light pattern reflected by the wheel and the road surface using an image recording device;
    determining 3D coordinates of points of the reflected light pattern;
    identifying points of the reflected light pattern belonging to the wheel;
    identifying points of the reflected light pattern belonging to the road surface;
    determining a position of the center of rotation of the wheel from the points of the reflected light pattern, which have been identified as belonging to the wheel;
    determining a position of the road surface from the points of the reflected light pattern, which have been identified as belonging to the road surface; and
    determining a rolling radius as the distance between the center of rotation of the wheel and the road surface on the wheel contact surface.

2. The method of claim 1, wherein the distance between the center of rotation of the wheel and the position of the road surface is measured at a right angle to the road surface or at a right angle to the axis of rotation of the wheel.

3. The method of claim 1, wherein the method includes determining the track width of the vehicle and taking it into account in determining the center of rotation.

4. The method of claim 1, further comprising:
    subdividing the road surface into multiple segments; and
    determining the positions of the individual segments.

5. The method of claim 4, wherein the characteristic point is a valve on the wheel or a feature on a sidewall of a tire mounted on the wheel.

6. The method of claim 1, further comprising:
    recording the reflected points of light using multiple measured value sensors; and
    transferring them to a coordinate system shared by all measured value sensors, wherein reference systems are used to define the shared coordinate system of the measured value sensors.

7. The method of claim 6, further comprising:
    comparing rolling radii of at least two wheels of the vehicle; and
    outputting a message when a difference between the rolling radii exceeds a predefined threshold.

8. The method of claim 1, wherein at least one of the following is satisfied: (a) the recording of the light pattern includes recording the points of light using at least two cameras or one stereo camera and determining 3D coordinates of each point of light by triangulation; and (b) the projecting of the light pattern includes a calibrated point of light projection and the recording of the light pattern includes recording the reflected points of light using a mono camera.

9. A method for determining a rolling radius of a wheel of a motor vehicle, the method comprising:
- projecting light onto the wheel;
- recording points of light reflected by the wheel using an image recording device;
- determining a center of rotation of the wheel and a characteristic point on the wheel, which is located outside of the center of rotation of the wheel, from points of light reflected by the wheel;
- determining an orientation of a connecting line between the center of rotation and the characteristic point;
- rolling the wheel on a road surface;
- recording points of light reflected by the rolled wheel;
- determining the position of the center of rotation of the rolled wheel and the position of the characteristic point, situated outside the center of rotation, of the rolled wheel from the points of light reflected by the rolled wheel;
- determining the orientation of the connecting line between the center of rotation and the characteristic point of the rolled wheel;
- determining an angle of rotation of the rolling motion of the wheel from a change in the spatial orientation of the connecting line due to the rolling of the wheel;
- determining a rolling distance from the displacement of the center of rotation due to the rolling of the wheel parallel to the road surface; and
- determining a rolling radius of the wheel from the rolling angle and the rolling distance.

10. A device for determining a rolling radius of a wheel of a motor vehicle, comprising:
- at least one lighting device configured to project light onto the wheel and onto a road surface;
- at least one image recording device configured to record points of light reflected by at least one of the wheel and the road surface; and
- an evaluation device configured to determine a rolling radius of the wheel by performing the following:
  - projecting a light pattern onto the wheel and the road surface;
  - recording a light pattern reflected by the wheel and the road surface using an image recording device;
  - determining 3D coordinates of points of the reflected light pattern;
  - identifying points of the reflected light pattern belonging to the wheel;
  - identifying points of the reflected light pattern belonging to the road surface;
  - determining a position of the center of rotation of the wheel from the points of the reflected light pattern, which have been identified as belonging to the wheel;
  - determining a position of the road surface from the points of the reflected light pattern, which have been identified as belonging to the road surface; and
  - determining a rolling radius as the distance between the center of rotation of the wheel and the road surface on the wheel contact surface.

* * * * *